United States Patent [19]

Sheng-Hsin

[11] Patent Number: 5,796,047
[45] Date of Patent: Aug. 18, 1998

[54] ELECTRIC BOX FOR CONNECTION BETWEEN A HANDSET AND A TELEPHONE BASE

[76] Inventor: Liao Sheng-Hsin, No. 10, Alley 38, Lane 229, San Chun St., Shu Lin Town, Taipei Hsien, Taiwan

[21] Appl. No.: 897,602

[22] Filed: Jul. 21, 1997

[51] Int. Cl.$^6$ .................................................. H04M 1/100
[52] U.S. Cl. .............................. 174/135; 439/21; 439/22
[58] Field of Search .................. 174/135; 439/21, 439/22; 191/12.2 R, 12.4, 4; 397/438; 242/118.41, 378

[56] References Cited

U.S. PATENT DOCUMENTS

| | | | |
|---|---|---|---|
| 3,657,491 | 4/1972 | Ryder et al. | 191/12.2 |
| 4,481,607 | 11/1984 | Hsiao | 439/4 |
| 5,082,448 | 1/1992 | Kang | 439/22 |
| 5,241,593 | 8/1993 | Wagner | 191/12.4 |
| 5,590,749 | 1/1997 | Wagner et al. | 191/12.4 |
| 5,690,498 | 11/1997 | Sobhani | 439/22 |

*Primary Examiner*—Kristine L. Kincaid
*Assistant Examiner*—Joseph Waks
*Attorney, Agent, or Firm*—Rosenberg, Klein & Bilker

[57] ABSTRACT

An electric box connected between a telephone base and a handset, including a housing having a hollow upright shaft on the inside, a rotary member turned about the upright shaft of the housing, a spiral spring mounted in the housing and having two ends respectively fastened to the upright shaft and the rotary member, a holder fastened to the rotary member and holding a plurality of concentrically arranged metal rings, a plurality of terminals mounted in respective holes in the housing and supported on respective metal springs respectively disposed in contact with the metal rings, a flat cable wound around the rotary member and having one end extended out of the housing and mounted with a module plug for connection to the handset and an opposite end connected to the metal rings, a mounting block mounted on the housing on the outside, a module plug mounted on the mounting blocks for connection to the telephone base and having contacts respectively disposed in contact with the terminals.

6 Claims, 7 Drawing Sheets

5,796,047

1

ELECTRIC BOX FOR CONNECTION BETWEEN A HANDSET AND A TELEPHONE BASE

BACKGROUND OF THE INVENTION

The present invention relates to an electric box for connection between a handset and a telephone base, and more specifically to such an electric box which has a reversible cable that permits the user to use the handset at a distance far away from the telephone base.

A regular telephone set is generally comprised of a telephone base, a handset, and a handset cord connected between the telephone base and the handset. Because of the limitation of the handset cord, the user cannot move far away from the telephone base when holding the handset. Furthermore, because the handset cord is exposed to the outside, it tends to be tangled.

SUMMARY OF THE INVENTION

The present invention has been accomplished to provide an electric box for connection between a handset and a telephone base which eliminates the aforesaid problems. It is one object of the present invention to provide an electric box for connection between a handset and a telephone base which has a reversible cable that permits the user to use the handset at a distance far away from the telephone base. It is another object of the present invention to provide an electric box for connection between a handset and a telephone base which automatically takes up the cable when the handset is hung on the telephone base.

DETAILED DESCRIPTION OF THE PREFERRED EMBODIMENT

Figure 1:
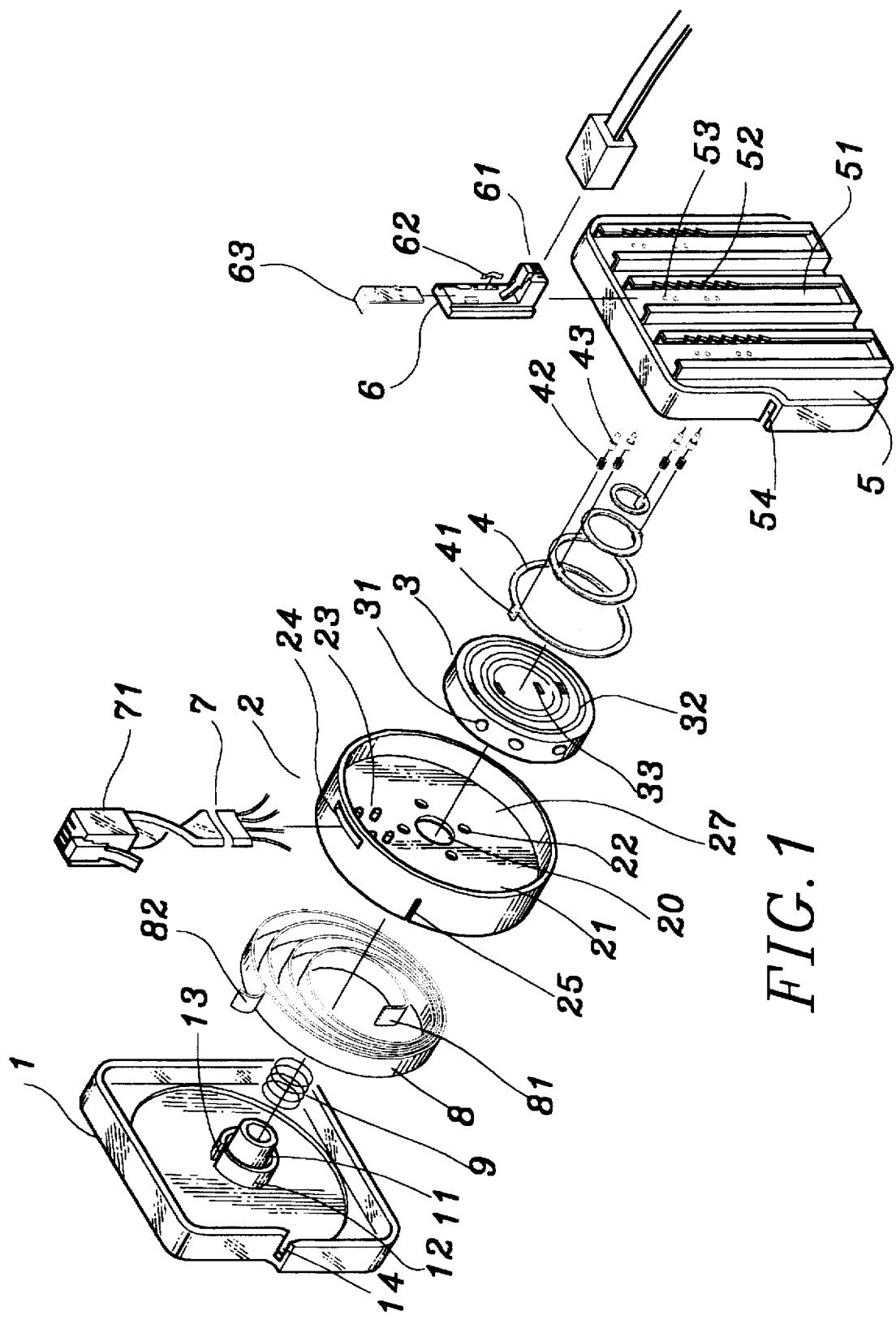
FIG. 1 is an exploded view of an electric box according to one embodiment of the present invention.

Referring to Figures from 1 to 6, an electric box in accordance with the present invention comprises a housing, which is comprised of a bottom shell 1 and a cover shell 5 fastened together. The bottom shell 1 and the cover shell 5 have a respective side notch 14;54. When the bottom shell 1 and the cover shell 5 are fastened together, the side notches 14;54 are matched together, forming a cable hole A. The bottom shell 1 comprises a hollow upright shaft 11 raised from the inside at the center, a split upright stub tube 12 raised from the inside and spaced around the upright shaft 11 and having a split 13. A spiral spring 8 is mounted around the arched flanges 12, having a hooked inner end 81 fastened to the split 13 of the split upright stub tube 12 and a hooked outer end 82 fastened to a peripheral notch 25 of a rotary member 2. The rotary member 2 comprises a circular bottom chamber 26 which receives the spiral spring 8 a circular top

Figure 2:
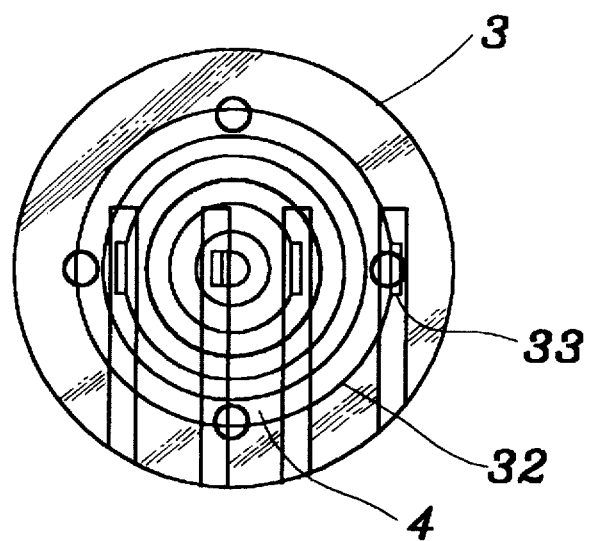
FIG. 2 is side plain and top plain views of the metal ring holder according to the present invention.
Figure 2:
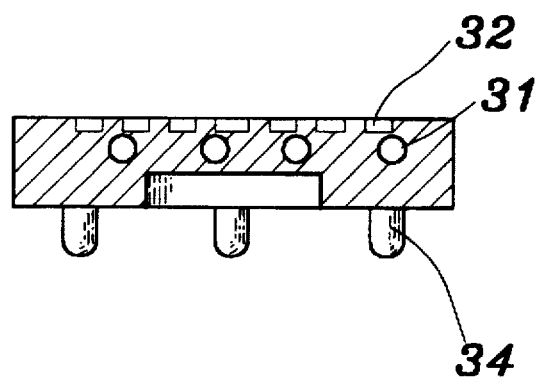
Figure 3:
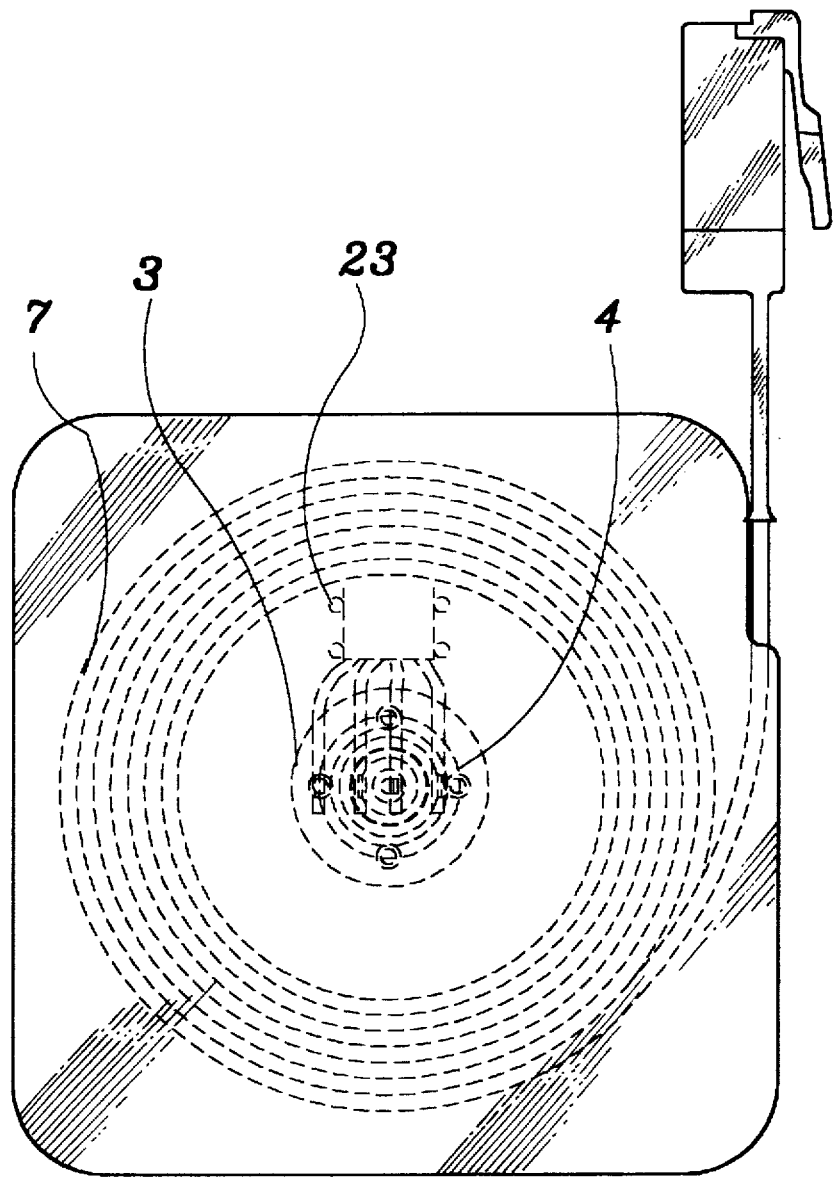
FIG. 3 is a top plain view of the present invention.
Figure 4:
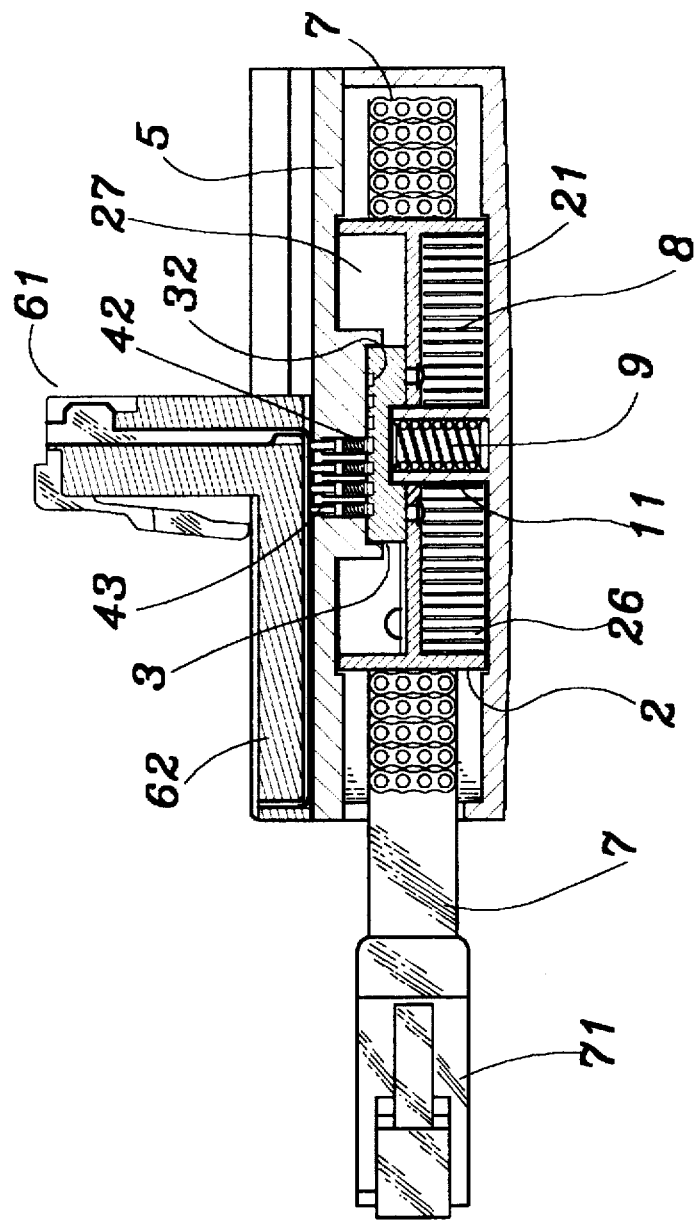
FIG. 4 is sectional assembly of the electric box shown in FIG. 1.
Figure 5:
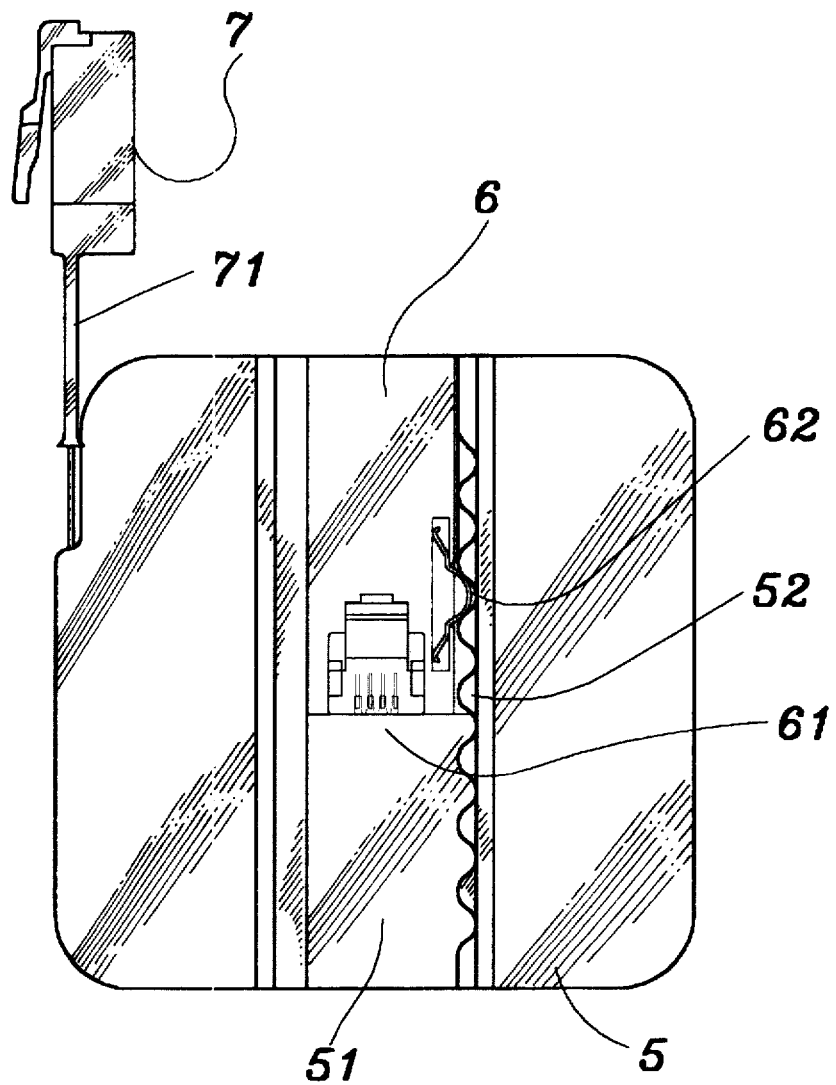
FIG. 5 is a top assembly view of the electric box shown in FIG. 1.
Figure 6:
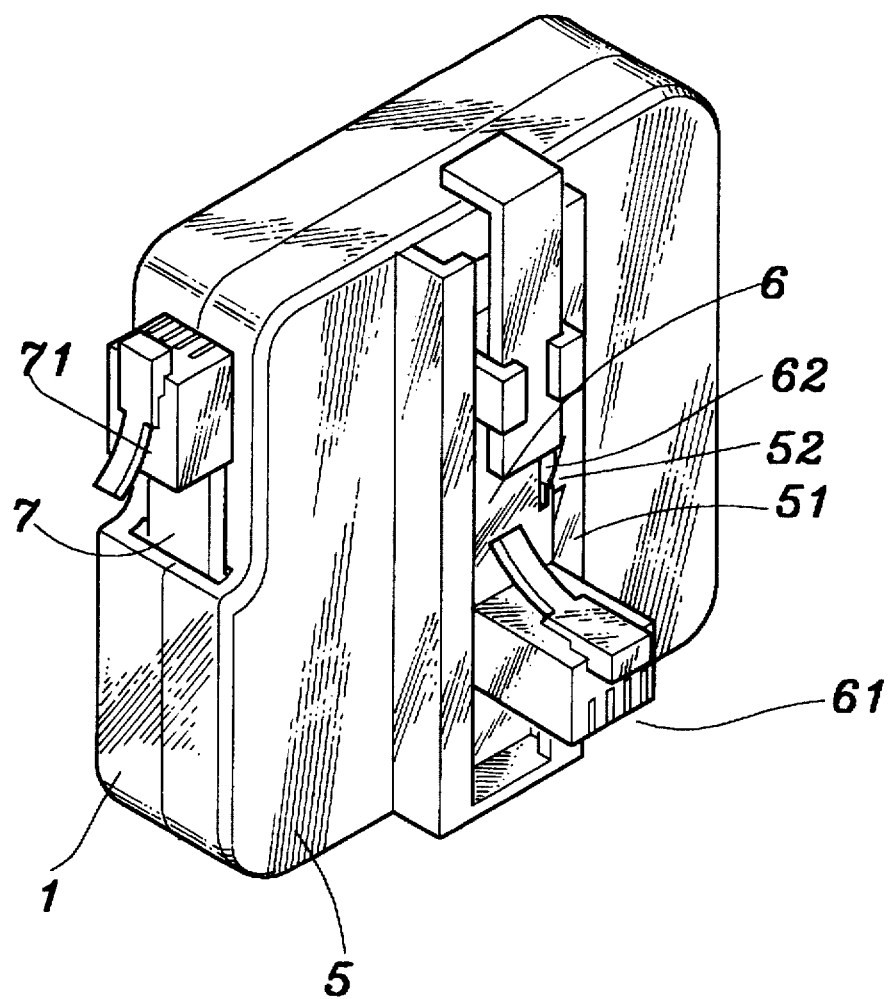
FIG. 6 is a perspective elevational view of the electric box shown in FIG. 1.

2 chamber 27, a partition wall 21 which separates the bottom chamber 26 from the top chamber 27, a slot 24 at the periphery through which a flat cable 7 is inserted, an axle hole 20 at the center of the partition wall 21 which receives the upright shaft 11 of the bottom shell 1, a plurality of upright guide rods 23 raised from the partition wall 21 in the top chamber 27 for guiding the wires of the flat cable 7, and a plurality of pin holes 22 spaced around the axle hole 20. A metal ring holder 3 is mounted around the upright shaft 11 of the bottom shell 1 within the top chamber 27 of the rotary member 2, comprising a plurality of circular grooves 32 concentrically disposed at one side, a plurality of slots 33 corresponding to the circular grooves 32, plurality of through holes 31 at the periphery, and a plurality of bottom pins 34 adapted for fastening to the pin holes 22 of the rotary member 2 (see FIG. 2). The flat cable 7 is wound round the rotary member 2, having one end extended out of the cable hole A (see FIG. 3) and terminating in a module plug 71 for connection to a module jack of a handset (not shown), and an opposite end inserted into the slot 24 of the rotary member 2. A plurality of metal rings 4 of different diameters are respectively mounted in the circular grooves 32 of the rotary member 3, having a respective pointed tip 41 raised from the periphery and respectively inserted into the slots 33 and forced into contact with a respective conductor of the wires of the flat cable 7. The cover shell 5 comprises a sliding groove 51, a rack 52 disposed within the sliding groove 51 at one side, and a plurality of through holes 53 in the sliding groove 51. A plurality of metal springs 42 are respectively mounted in the through holes 53 of the cover shell 5 and disposed in contact with the metal rings 4. A plurality of terminals 43 are respectively mounted in the through holes 53 and supported on the metal springs 42. A sliding block 6 is mounted on the cover shell 5 and moved in the sliding groove 51, having a module plug 61 at its front side and a springy pawl 62 at one side. When the sliding block 6 is inserted into the sliding groove 51, the springy pawl 62 is forced into engagement with the rack 52, and the contacts (not shown) of the module plug 61 are respectively moved into contact with the terminals 43, and therefore the module plugs 61;71 are electrically connected (see FIG. 5). Further, a spring 9 is mounted in the upright shaft 11 and partially projects into the axle hole 20 of the rotary member 2 to impart an upward pressure to the metal ring holder 3, and therefore the terminals 43 can be firmly retained in contact with the contacts of the module plug 61. Further, a pressure plate 63 is coupled to the sliding block 6 and stopped at the slip of the module plug 61 for installation control. When in use, the module plugs 61;71 are respectively connected to the telephone base and the handset. When the user holds the handset in hand and moves to a distance from the telephone base, the flat cable 7 is pulled out of the housing 1;5, therefore the user is allowed to carry the handset away from the telephone base to a certain distance. When the handset put back to the telephone base, the spiral spring 8 immediately returns to its former shape, causing the flat cable 7 to be taken up and received in the housing 1;5.

Figure 7:
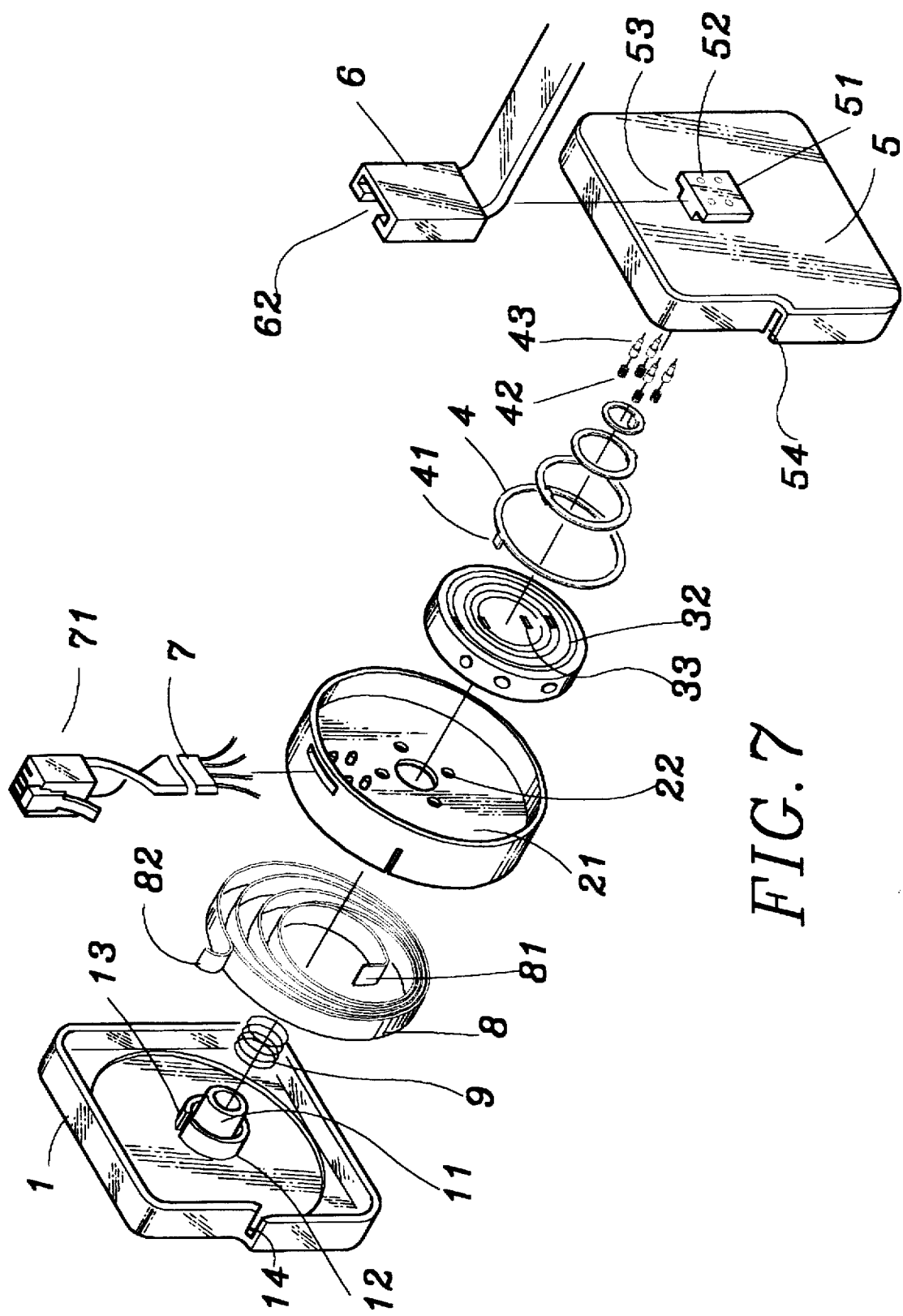
FIG. 7 is an exploded view of an alternate form of the present invention.

FIG. 7 shows an alternate form of the present invention, in which the cover shell 5 comprises a T-block 65 raised from its outside wall and defining with its outside wall two coupling grooves 56, and a plurality of through holes 53 through the T-block 65; the terminals 43 are respectively supported on the metal springs 42 and project into the through holes 53; a coupling block 64 is mounted with a module plug (not shown), having a coupling groove 65 adapted to match with the coupling grooves 56 of the cover shell 5 for permitting the coupling block 64 to be secured to the T-block 55. When the coupling block 64 is coupled to the T-block 55, the contacts of the module plug of the sliding block 64 are forced into contact with the terminals 43 respectively. When the coupling block 64 and the T-block 55 are coupled together, they are fixedly fastened together by a high-frequency heat sealing apparatus or a thermal welding apparatus.

It is to be understood that the drawings are designed for purposes of illustration only, and are not intended as a definition of the limits and scope of the invention disclosed.

What the invention claimed is:

1. An electric box connected between a telephone base and a handset, comprising:
    a housing having a cable hole, said housing comprised of a bottom shell and a cover shell placed on said bottom shell, said bottom shell comprising a hollow upright shaft on an inside at a center, and a split upright stub tube spaced around said upright shaft, said cover shell having a plurality of through holes;
    a rotary member mounted inside said housing and turned about said upright shaft of said bottom shell, said rotary member comprising a bottom chamber, a partition wall, a top chamber separated from said bottom chamber by said partition wall, an axle hole at a center of said partition wall which receives the upright shaft of said bottom shell, a slot and a notch at a periphery;
    a spiral spring mounted in said bottom chamber of said rotary member, having a hooked inner end fastened to a split of said split upright stub tube of said bottom shell and a hooked outer end fastened to the notch of said rotary member;
    a metal ring holder mounted in said top chamber of said rotary member and having a plurality of circular grooves of different diameters concentrically disposed at a top side;
    a flat cable wound around said rotary chamber, having one end inserted into the slot of said rotary member and connected to said metal ring holder and an opposite end extended out of the cable hole of said housing and mounted with a first module plug for connection to said handset;
    a plurality of metal rings respectively mounted in the circular grooves of said metal ring holder, having a respective pointed tip raised from a ring periphery and forced into contact with respective conductors in said flat cable;
    a plurality of metal springs respectively mounted in the through holes of said cover shell and disposed in contact with said metal rings;
    a plurality of terminals respectively supported on said metal springs in the through holes of said cover shell;
    a mounting block mounted on said cover shell; and
    a second module plug mounted on said mounting block for connection to said telephone base, having contacts respectively disposed in contact with said terminals.

2. The electric box of claim 1, wherein said cover shell has a sliding groove on an outer side and a rack within said sliding groove; said mounting block is mounted in said sliding groove of said cover shell, having a spring pawl forced into engagement with the rack of said cover shell.

3. The electric box of claim 1, wherein said partition wall of said rotary member has a plurality of pin holes spaced around said axle hole; said metal ring holder comprises a plurality of bottom pins respectively fitted into the pin holes of said rotary member.

4. The electric box of claim 1, wherein a spring is mounted in the hollow upright shaft of said bottom shell to impart an upward pressure to said metal ring holder toward said cover shell.

5. The electric box of claim 1, wherein said mounting block comprises a pressure plate stopped at a clip of said second module plug for mounting control.

6. The electric box of claim 1, wherein said cover shell comprises a T-block having a plurality of through holes, which receive said terminals; said mounting block comprises a coupling groove coupled to said T-block.

* * * * *